June 19, 1928.
F. J. MALONE
WORK FIXTURE
Filed Dec. 22, 1922
1,674,291
2 Sheets-Sheet 1
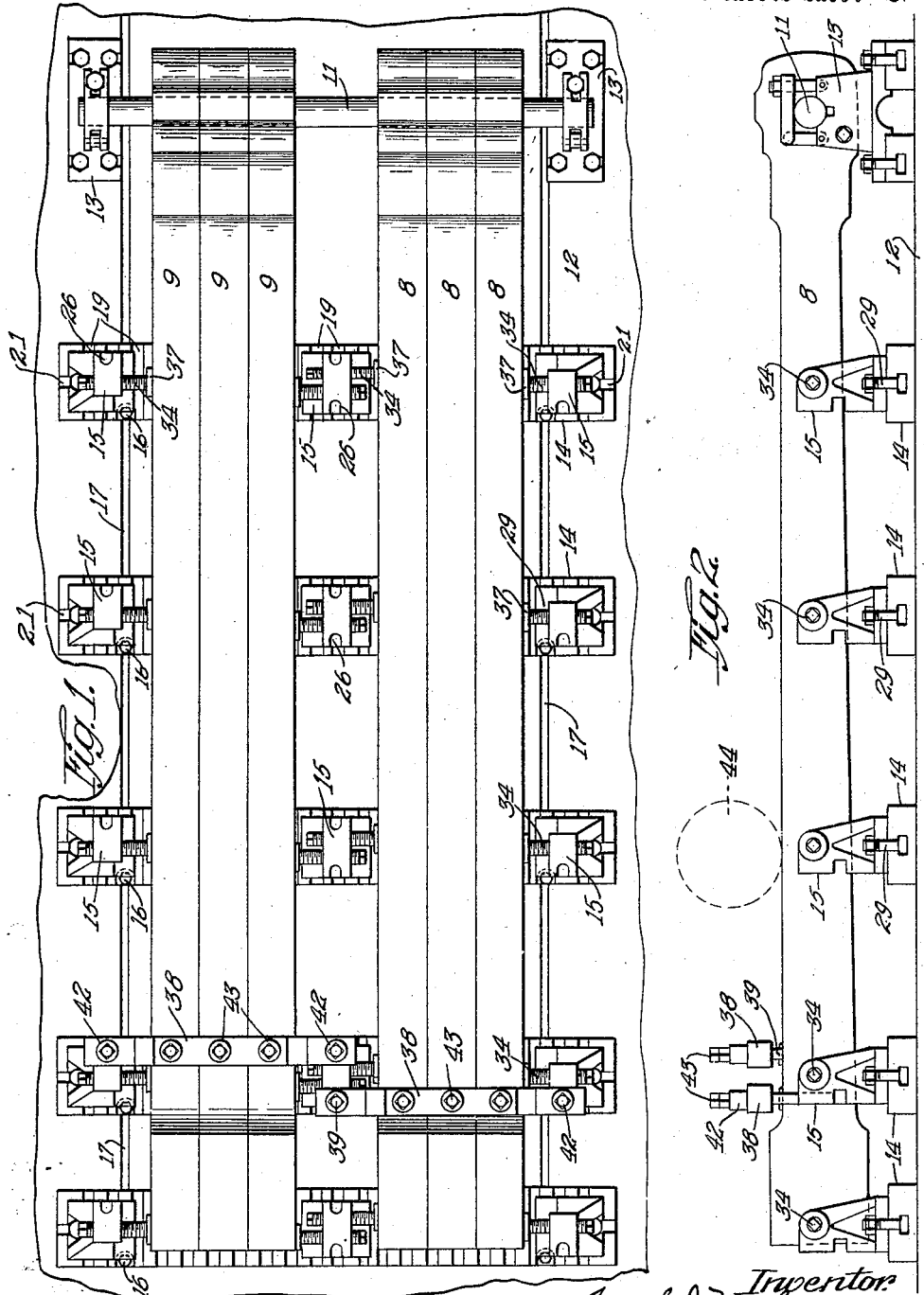

June 19, 1928.
F. J. MALONE
WORK FIXTURE
Filed Dec. 22, 1922
1,674,291
2 Sheets-Sheet 2
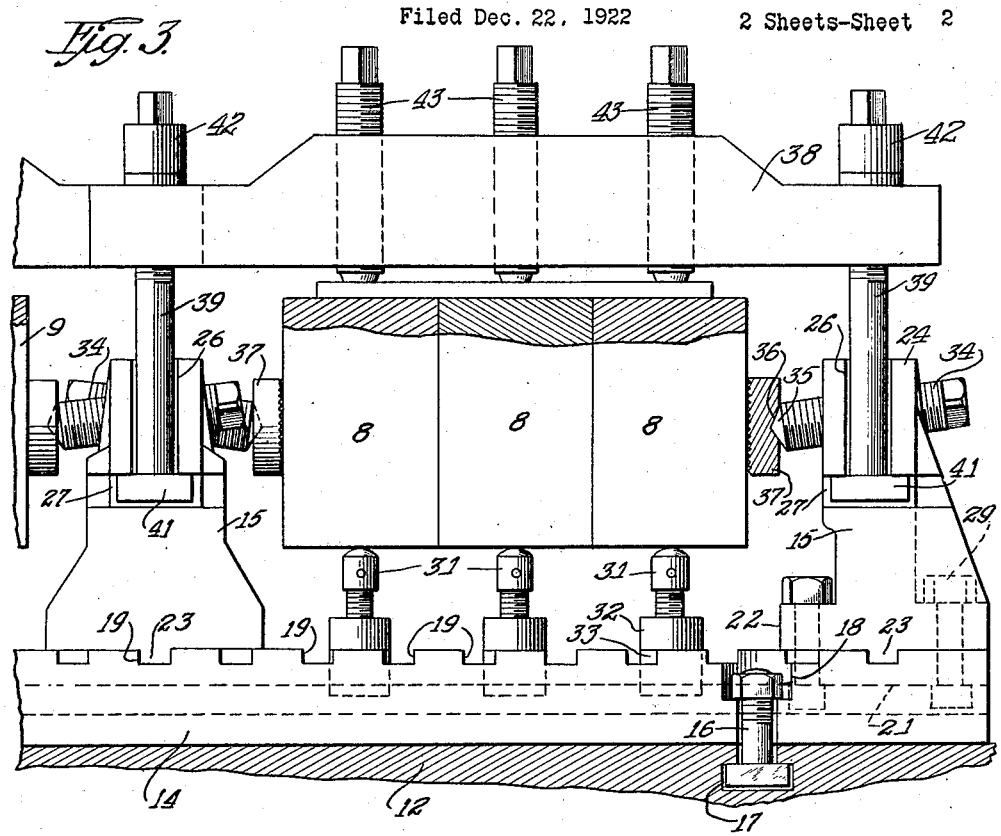
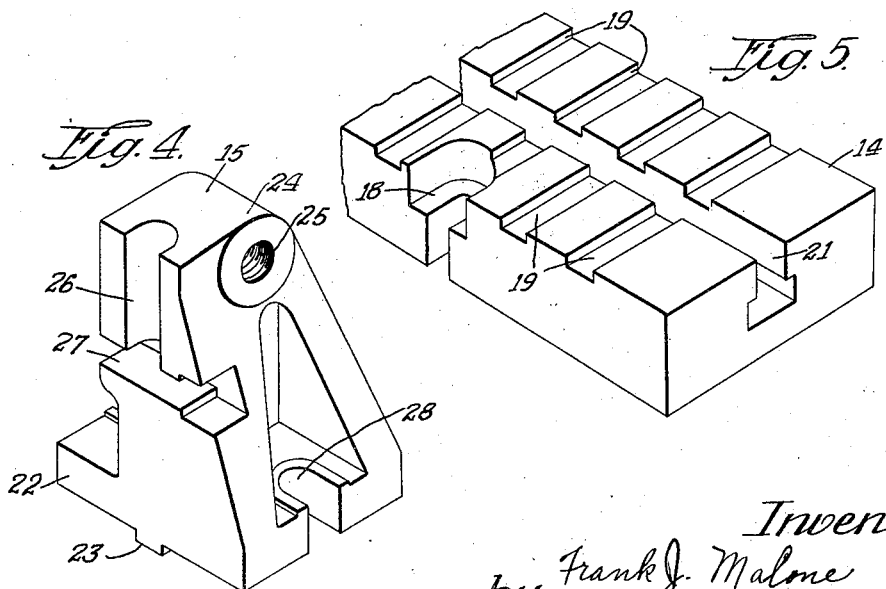
Witness:
Loie Condé.
Inventor:
Frank J. Malone
by Wilson & McCanna
Attys.

Patented June 19, 1928.

1,674,291

UNITED STATES PATENT OFFICE.

FRANK J. MALONE, OF ROCKFORD, ILLINOIS, ASSIGNOR TO THE INGERSOLL MILLING MACHINE COMPANY, OF ROCKFORD, ILLINOIS, A CORPORATION OF ILLINOIS.

WORK FIXTURE.

Application filed December 22, 1922. Serial No. 608,389.

This invention relates to work fixtures adapted for rigidly holding work-pieces on a work table in a set position in which to be operated on by a cutter, and has more particular reference to that class of fixtures designed for use in connection with milling machines, planers and the like. My invention is, however, adapted for holding workpieces in set position on any work table or support.

The primary object is to provide an improved work fixture, universal in its adaptability to work-pieces of different sizes and proportions and capable of being quickly and easily fitted to such work-pieces, for the purpose of reducing to a minimum the "floor-to-floor" time, that is, the time consumed in setting a work-piece in the fixture, machining and removing it from the fixture. My invention is particularly advantageous in setting work-pieces for different successive operations on the same machine, as it enables a material reduction in time and is an important factor in the cost of manufacture of such work-pieces.

More particularly, my invention is especially adapted for rigidly clamping locomotive rods and similar work-pieces in different set positions, in which slabbing, profile milling and other operations may be performed, so that the time required for setting up the work-pieces and resetting them between operations is reduced to a minimum.

Another object is to provide an improved work fixture of the universal character described, constructed for clamping the workpieces with such rigidity as to withstand, without vibration, the strains resulting from heavy-duty milling operations.

Other objects and attendant advantages will be appreciated by those skilled in the art as the invention becomes better understood by reference to the following description when considered in connection with the accompanying drawings, in which—

Figure 1 is a top view of a multiple of locomotive main rods held on a work table by work fixtures embodying my invention;

Fig. 2 is a side elevation of the parts shown in Fig. 1;

Fig. 3 is an enlarged view, partly in section, looking at the left hand end of Fig. 1, showing half of the fixture disclosed therein;

Fig. 4 is a perspective view of one of the clamping brackets; and

Fig. 5 is a perspective view of one end of a base bar used in the fixture.

While my improved work fixture is applicable to a great variety of work-pieces, I have in the present instance taken as an example its application to locomotive main rods. It is desired to support these with extreme rigidity on a work table for milling all four sides by slabbing, channeling, and profile-milling cutters. In the present case, two groups, each of three locomotive rods, are shown, held by my improved fixture, in a position for simultaneously milling one edge of the rods. In this case, certain of the fixture elements are duplicated for the particular job; and as the invention becomes better understood, it will be seen that the several fixture elements might be used in various combinations to suit the particular work at hand.

In the present case, the rods 8 and 9, making up the two groups referred to, are supported at one end on an arbor 11, in turn rigidly supported on the work table 12, by suitable brackets 13. As shown, the arbor extends beyond the work-piece and is seated at its ends on arcuate locating faces or the equivalent on the brackets 13 and secured thereto by top clamping elements. The brackets 13 are adjustable on the table by the bolt and T-slot mounting shown. My invention contemplates but is not necessarily confined to the mounting of one or more work-pieces in this manner on transverse base bars 14 in combination with devices for clamping the work-piece at its sides at longitudinally spaced points, and an overhead shiftable clamping device or equivalent means for successively clamping the workpiece down on the table at points in advance of the cutter. In the present embodiment the overhead clamping device is shifted step by step as the cutter advances from the arbor-supported end of the workpiece to the opposite end and is secured after each change of position in a clamping position in advance of the cutter so that the work-piece will be most securely and rigidly held without deflection, distortion or vibration. This feature of my invention is especially desirable in the milling of elongated work-pieces of the character disclosed herein and is thoroughly practical especially where the cuts are comparatively heavy and accuracy is required.

The side clamping devices are at present in the form of clamping brackets designated generally by 15, mounted for adjustment lengthwise on the base bars. The base bars 14, preferably extend crosswise of the work table and are secured thereto by T-head anchor bolts 16 engaged in T-slots 17 in the table and in anchor bolt sockets 18 in the base bars. The T-slots 17 extend lengthwise of the table and permit adjustment of the base bars longitudinally thereon. Each base bar has a series of transverse slots or grooves 19 in its top surface which intersect a T-slot 21 in the top of the bar extending longitudinally thereof. The transverse slots provide means for locating said clamping brackets on the base bars, and the T-slots serve for the reception of anchor bolts for securing the brackets to the base bar.

The clamping brackets 15 referred to above each comprises a base portion 22 having a depending rib or lug 23 adapted to fit in one of the slots 19 and having an upstanding portion 24 having a threaded bore 25 and vertical and horizontal slots 26 and 27 forming a T-slot open at one side of the bracket. The bracket is also shaped to provide a socket 28 on each side of the rib 23 for the reception of an anchor bolt 29 for securing the bracket to the base bar. It will be evident that a clamping bracket may be located in any position on one of the base bars defined by location of its rib 23 in one of the slots 19, and that the bracket may be rigidly clamped to said base bar by means of the anchor bolts 29. This construction permits quick adjustment of the brackets crosswise of the work table and also insures a very rigid and substantial connection between the brackets and the table.

The work-pieces will be supported on the base bar 14 through the agency of screw jacks 31, each of which is threaded in a block 32 having a reduced end 33 adapted to fit in the T-slot and move longitudinally therein. The work thus supported will be clamped at its sides by and between clamping screws 34, which are threadedly engaged in the bores 25 in the brackets. These clamping screws, inclined downwardly toward the work, have tapered ends 35 fitting in complemental sockets 36 in clamping blocks 37. By reason of this arrangement the side clamping thrust will be in a downwardly inclined plane tending to draw the work down onto the jacks 31; and to insure a positive grip between the blocks 37 and the work, the face of each block is serrated.

An overhead clamp is also provided for directly holding the work down onto the jacks or seats 31, comprising a top clamping bar 38 supported at its ends on bolts 39, each having a T-head 41 engaged in the T-slot in the side of one of the clamping brackets 15. By means of the nuts 42 on the bolts 39, the bar 38 may be leveled at a proper elevation. Vertical clamping screws 43 threadedly engaged in the bar 38 serves to impose a downward pressure on the work.

In setting up any given work-piece, it will be evident that the number of clamp brackets will depend entirely on the length of the work-piece and the nature of the cut to be performed. These side clamps will in most cases be sufficient for rigidly securing the work on the table; but in some instances, such as the present example, the overhead clamp is necessary, especially when a heavy cut is taken. The overhead clamping bar 38 will be moved from one pair of clamping brackets to another in advance of the cutter, thus localizing the downward pressure to the region of the greatest strain and avoiding interference with the cutter. In the case under consideration, the work table feeds to the right viewing Fig. 2, and the clamping bar 38 has been moved from the clamping brackets at the extreme right hand end in succession to its present location; and assuming that the work has been milled to the point indicated by location of the cutter 44, the clamping bar 38 will not be removed until the cutter reaches a point midway between the second and third brackets from the left, at which time said clamping bar will be shifted to the latter clamping bracket.

Referring now to the group arrangement of the work-pieces, it will be noted that the clamping brackets intermediate the two groups are each equipped with a pair of side clamping screws, which serve for clamping both groups of work-pieces. These central brackets also have opposed T-slots for reception of the vertical bolts 39 of the top clamping bar for each group. These double clamping brackets are not essential to my invention as they simply illustrate a special application in which it is desired to support two groups of work-pieces in close relation.

It will be evident, however, that by reason of the forgoing construction, the work-pieces may be quickly removed from the fixture simply by loosening the several clamping screws and that the several elements of the fixture may be readjusted, for example, to clamp one of the rods in position to machine its flat side by means of a slabbing cutter. By reason of the adjustability afforded by movement of the base bars on the work table, the clamping brackets on the base bars and the clamping screws on the brackets, the fixture may be fitted to work-pieces of many sizes and shapes. Furthermore, the fixture elements are so constructed and associated as to permit setting up and taking down the work-pieces in comparatively short time, thus contributing as an important factor in reducing the "floor-to-floor" time to a minimum.

It is believed that the foregoing conveys a clear understanding of the objects prefaced above, and it should be understood that while I have illustrated a single working example, considerable change might be made in details of construction, when applying the fixture elements to work-pieces of different sizes and shapes, without departing from the spirit and scope of the invention as expressed in the appended claims.

I claim:

1. A work fixture comprising, in combination, a work table, a base bar mounted thereon having a longitudinal T-slot and longitudinally spaced recesses, a pair of clamping brackets shiftable lengthwise on the base bar and shaped to engage in and be located by any of said recesses, anchor bolts in said T-slot for securing the brackets to the base bar, a top clamp extending between said brackets and having a clamping screw to bear on top of a work-piece disposed between said brackets, and a downwardly inclined clamping screw threaded in each bracket for clamping the interposed work-piece from the side thereof.

2. A work fixture comprising a supporting member having a T-slot, clamping brackets, anchor bolts in said T-slot for securing the clamping brackets to the supporting member, clamping means on said brackets arranged for engagement with the work on top thereof and a clamping screw threadedly engaged in each bracket, the latter being arranged to engage the work on the side.

3. A work fixture comprising a supporting member having a T-slot intersected by transverse locating slots, clamping brackets having depending ribs adapted to fit in said locating slots, anchor bolts in said T-slots for securing the clamping brackets to the supporting member, a clamping screw threadedly engaged in each bracket, said screws being directed downwardly toward an interposed work-piece, and a clamping block between each screw and work-piece having a serrated work-engaging face.

4. A work fixture of the character described, comprising a base bar having a longitudinal T-slot, a pair of clamping brackets disposed in spaced relation on the base bar, a vertically adjustable seat on the base bar between said brackets and upon which the work-piece is adapted to rest, clamping means on said brackets arranged for acting against the top of the work-piece to hold it on the seat and a side clamping screw threadedly engaged in each bracket for clamping the interposed work from the side thereof, said screws being inclined downwardly toward the work for further insuring holding it against said seat.

5. A work fixture of the character described comprising a base bar having a longitudinal T-slot, a pair of clamping brackets disposed in spaced relation on the base bar, a vertically adjustable seat on the base bar between said brackets and upon which the work-piece is adapted to rest, a side clamping screw threadedly engaged in each bracket for clamping the interposed work, said screws being inclined downwardly toward the work for holding it against said seat, a top clamp overlying the work-piece, and a bolt for each bracket for drawing the top clamp down onto the work-piece.

6. A work fixture of the character described comprising a base bar slotted transversely on its top and adapted to be fixed to a work table, a clamping bracket having a depending rib adapted to fit in any of said slots for locating the bracket on the base, means for rigidly clamping the bracket on the base in any located position, a screw jack mounted on the base bar providing a seat for the work-piece, a side clamping screw threadedly engaged in said bracket, and a clamping block adapted to be interposed between said screw and the adjacent side of the work-piece for imposing lateral clamping pressure.

7. A work fixture of the character described comprising a base bar slotted transversely on its top and adapted to be fixed to a work table, a clamping bracket having a depending rib adapted to fit in any of said slots for locating the bracket on the base, means for rigidly clamping the bracket on the base in any located position, a screw jack mounted on said base bar providing a seat for the work-piece, a side clamping screw threadedly engaged in said bracket, a clamping block adapted to be interposed between said screw and the adjacent side of the work-piece for imposing lateral clamping pressure, and means for clamping the work-piece from overhead, including a clamping bolt attached to said bracket.

8. A work fixture of the character described comprising a base bar having on its top transverse slots intersecting a longitudinal T-slot, a clamping bracket having a depending rib adapted to seat in any of said transverse slots and having an upstanding portion provided with a vertical T-slot and a horizontally disposed threaded bore, the base portion of said bracket being shaped on opposite sides of said upstanding portion for the reception of anchor bolts, anchor bolts having T-heads located in the T-slot in the base for clamping the bracket thereto, a side clamping screw threadedly engaged in said bore, an overhead clamp, and a vertical clamping bolt having a T-head and adapted to be inserted in said vertical T-slot from one side of the bracket for drawing said overhead clamp down onto the work-piece.

9. A work fixture comprising, in combination, a work table, plural pairs of brackets equipped with screws for clamping the sides of an interposed work-piece at longitudinally spaced points thereon and each having at one side a T-shaped slot, and a top clamp having vertical T-head bolts adapted to be located in the T-slots of any pair of brackets for clamping the work-piece down in advance of the cutter.

10. A work fixture comprising, in combination, a work table, a plurality of transverse base bars adjustable longitudinally on the work table, each bar having a longitudinal T-slot and a series of longitudinally spaced locating slots, a pair of side clamping brackets mounted on each base bar for location in any of said spaced slots, means for securing said brackets to the base bars in the located positions, means acting against said brackets for clamping an interposed work-piece, vertically adjustable jacks on which the work-piece rests, and an overhead clamping device adapted to be shifted longitudinally of the work-piece for clamping it down progressively with respect to advance of a cutter along the work-piece.

11. A work fixture comprising, in combination, a work table, a series of base bars mounted thereon, each having a longitudinal T-slot intersected by transverse slots, a pair of clamping brackets mounted on each base bar, each bracket having a depending lug for location in any of said transverse slots, anchor bolts in said T-slots for securing the brackets to the base bars, a screw threaded in each bracket and inclined downwardly for clamping a work-piece interposed between the brackets, and a clamping block for each screw having a gripping face adapted to be clamped against a side of the work-piece by the screw pressure.

12. In a work fixture, a clamping bracket comprising a body having a base portion and an upstanding portion, a depending locating lug on the base portion, an anchor bolt opening provided in the base portion, a screw clamp threadedly engaged in the upright portion, and a T-shaped slot in one side of the upright portion.

13. In a work fixture, in combination, a work table, a base bar thereon having a longitudinal T-slot and a series of longitudinally spaced locating slots, a pair of clamping brackets each shaped to be located on the base bar by engagement in a locating slot, anchor bolts in the T-slot for securing the clamping brackets to the base bar, a clamping screw in each bracket, and a serrated block for each screw adapted to be clamped thereby with its serrated face against a side of the work-piece.

14. In a work fixture in combination, a work table, a base bar thereon having a longitudinal T-slot and a series of longitudinally spaced locating slots, a pair of clamping brackets each shaped to be located on the base bar by engagement in a locating slot, anchor bolts in the T-slot for securing the clamping brackets to the base bar, a clamping screw in one of said brackets for clamping a work-piece interposed between them, a T-shaped slot in one side of each clamping bracket, a vertical T-head bolt in each bracket slot, and an overhead clamp on said vertical bolts for clamping down the work-piece.

FRANK J. MALONE.